United States Patent [19]

Corpora et al.

[11] Patent Number: 5,132,076
[45] Date of Patent: Jul. 21, 1992

[54] IN-CONTAINMENT CHEMICAL DECONTAMINATION SYSTEM FOR NUCLEAR RECTOR PRIMARY SYSTEMS

[75] Inventors: Gary J. Corpora, Monroeville; Frank I. Bauer, Perry Township, Lawrence County; Gordon A. Israelson, Murrysville; Donald E. Skoczylas, Monroeville, all of Pa.

[73] Assignee: Westinghouse Electric Corp., Pittsburgh, Pa.

[21] Appl. No.: 629,402

[22] Filed: Dec. 18, 1990

[51] Int. Cl.⁵ .............................................. G21C 19/42
[52] U.S. Cl. .................................... 376/310; 376/313; 376/305; 376/306
[58] Field of Search ................ 376/313, 310, 305, 306; 252/631

[56] References Cited

U.S. PATENT DOCUMENTS

| | | | |
|---|---|---|---|
| 3,700,550 | 10/1972 | Shiells | 376/313 |
| 3,976,541 | 8/1976 | Stiteler et al. | 376/310 |
| 4,432,393 | 2/1984 | Lee et al. | 252/631 |
| 4,437,933 | 3/1984 | Kikkawa et al. | 976/DIG. 381 |
| 4,699,755 | 12/1987 | Dagard et al. | 376/313 |
| 4,731,124 | 3/1988 | Bradbury et al. | 134/3 |
| 5,009,836 | 4/1991 | Grimm et al. | 376/260 |

FOREIGN PATENT DOCUMENTS 2085215  4/1982  United Kingdom .

Primary Examiner—Brooks H. Hunt
Assistant Examiner—Meena Chelliah
Attorney, Agent, or Firm—M. G. Panian

[57] ABSTRACT

A nuclear reactor having a chemical decontamination system is provided in which every piece of decontamination equipment which processes radioactive materials is located within the containment chamber of the nuclear reactor. This decontamination system therefore presents advantageous safety benefits over an outside of containment system in the unlikely event of a leak of radioactive materials from the decontamination system.

30 Claims, 6 Drawing Sheets

IN-CONTAINMENT CHEMICAL DECONTAMINATION SYSTEM FOR NUCLEAR RECTOR PRIMARY SYSTEMS

BACKGROUND OF THE INVENTION

1. Field of the Invention

The present invention relates to the field of decontamination of nuclear reactor primary systems. More specifically, it relates to a unique apparatus for integrating a chemical injection system, a clean-up subsystem and a resin replacement system into a nuclear reactor primary system for chemical decontamination of the entire primary system in which the process equipment which contacts radioactive materials are situated inside of the containment chamber.

2. Description of the Prior Art

The problem of excessive personnel exposures caused by high background radiation levels in a nuclear reactor primary system, such as in pressurized water reactor (PWR) systems, and the resultant economic cost of requiring personnel rotation to minimize individual exposure is significant at many nuclear plants. These background levels are principally due to the buildup of deposits of radioactive corrosion products in certain areas of the plant. The buildup of corrosion products exposes workers to high radiation levels during routine maintenance and refueling outages. The long term prognosis is that personnel exposure levels will continue to increase.

As a nuclear power plant operates, the surfaces in the core and primary system corrode. Corrosion products, referred to as crud, are activated during transport of the corroded material through the core region by the reactor coolant system (RCS). Subsequent deposition of the activated crud elsewhere in the system produces radiation fields in piping and components throughout the primary system, thus increasing radiation levels throughout the plant. The activity of the corrosion product deposits is predominately due to Cobalt 58 and Cobalt 60. It is estimated that 80-90% of personnel radiation exposure can be attributed to these elements.

One way of controlling worker exposure, and of dealing with this problematic situation, is to periodically decontaminate the nuclear steam supply system using chemicals, thereby removing a significant fraction of the corrosion product oxide films. Prior techniques had done very little to decontaminate the primary system as a whole, typically focusing only on the heat exchanger (steam generator) channel heads.

Two different chemical processes, referred to as LOMI (developed in England under a joint program by EPRI and the Central Electricity Generating Board) and CAN-DEREM (developed by Atomic Energy of Canada, Ltd.), have been used for small scale decontamination in the past. These processes are multi-step operations, in which various chemicals are injected, recirculated, and then removed by ion-exchange. Although the chemicals are designed to dissolve the corrosion products, some particulates are also generated. One method of chemical decontamination, U.K. Patent Application No. GB 2 085 215 A (Bradbury et al.). There is little disclosure, however, of the methodology to be used in applying that chemistry to system decontamination.

While these chemical processes had typically been used on only a localized basis, use of these chemical processes has now been considered for possible application on a large scale, full system chemical decontamination. Such an application is disclosed generally in co-pending application Ser. No. 07/621120, entitled "System For Chemical Decontamination Of Nuclear Reactor Primary Systems", and incorporated herein by reference.

While some work has been done in the boiling water reactor (BWR) programs, the BWR scenarios examined by those in the field involved decontaminating fuel assemblies in sipping cans employing commercial processes at off-normal decontamination process conditions with little regard for the effects of temperature, pressure, and flow that would be mandated by an actual application of the process to the full RCS.

The estimated collective radiation dose savings over a 10-year period following decontamination is on the order of 3500-4500 man rem, depending upon whether or not the fuel is removed during decontamination. At any reasonable assigning of cost per man-rem, the savings resulting from reduced dose levels will be in the tens of millions of dollars.

As a result of the present examination of potential full system decontamination, and the resulting need for new sub-system methods, developments have been made by the assignor of this invention to use demineralizing resin beds in conjunction with the known chemical processes. Developments in resin replacement systems for the demineralizer resin beds have also been made by the assignor of this invention. These developments are set forth in co-pending application Ser. No. 07/621129, entitled "Clean-up Sub-system for Chemical Decontamination of Nuclear Reactor Primary Systems", and in 07/621130, entitled "Resin Processing System", which are both incorporated herein by reference.

There exists a need for a design layout which incorporates these advanced full system decontamination systems and sub-systems and incorporates them into an existing or future reactor plant design. One such plant design would be an "in-containment" design in which the plant processing units which handle radioactive materials would be installed inside of the containment chamber.

SUMMARY OF THE INVENTION

The present invention is directed to a chemical decontamination system to be used in conjunction with a nuclear reactor primary system to achieve full primary system decontamination. More specifically, the present invention is directed towards a chemical decontamination system which is located primarily within a containment chamber. This "in-containment" system locates every piece of decontamination equipment which contacts radioactive materials inside of the containment chamber. Specifically, the systems which are contained within the containment chamber are the demineralizer system, the resin fines filter system, the spent resin storage tank system, and the sluice water system.

The demineralizer system is comprised of a plurality of demineralizer vessels which are downstream of and flow coupled to the primary system. The resin fines filter system is comprised of a plurality of resin fines filters which are downstream of and flow coupled to the demineralizer vessels.

The spent resin storage tank system is comprised of a plurality of spent resin storage tanks which are downstream of and flow coupled to said demineralizer vessels and which receive spent resin from the demineralizer vessels. The sluice water system is comprised of a sluice water supply tank which provides sluice water to the demineralizer vessels for removing the spent resin from the demineralizer vessels.

It is an object of the present invention to provide a process design which allows for the connection of a chemical decontamination system into a nuclear reactor primary system to economically and chemically decontaminate substantially the entirety of the nuclear reactor primary system in which the decontamination system equipment which contacts radioactive material is located inside the containment vessel.

DETAILED DESCRIPTION OF THE INVENTION

Certain aspects of the use of a full system chemical decontamination process to clean the primary reactor fluid system of radioactive "crud" is disclosed in co-pending Application Ser. No. 07/621130, entitled "System for Chemical Decontamination of Nuclear Reactor Primary Systems," application Ser. No. 07/621129, entitled "Clean-up Subsystem for Chemical Decontamination of Nuclear Reactor Primary System," and application Ser. No. 07/621130, entitled "Resin Processing System," all of which are incorporated herein by reference.

The designing of such a system to allow for the installation of all equipment coming into contact with radioactive material within the containment chamber is necessary for certain nuclear plants. Such an "in-containment" configuration has several advantages over an "outside-of-containment" configuration. First, in the unlikely event of a leak in the decontamination system equipment which is exposed to the radioactive material, the leak remains inside of containment. Second, the piping may be single wall hose since it is located within the containment area. Third, the process piping runs can be kept to a short distance, therefore negating the need for a secondary envelope medium to minimize the risk of a leak.

It has been found that the optimum interface between the chemical decontamination system and the primary reactor coolant system is via the residual heat removal (RHR) system. This is further detailed in a co-pending application Ser. No. 07/621120, entitled "System for Chemical Decontamination of Nuclear Reactor Primary Systems," and incorporated herein by reference.

Figure 1:
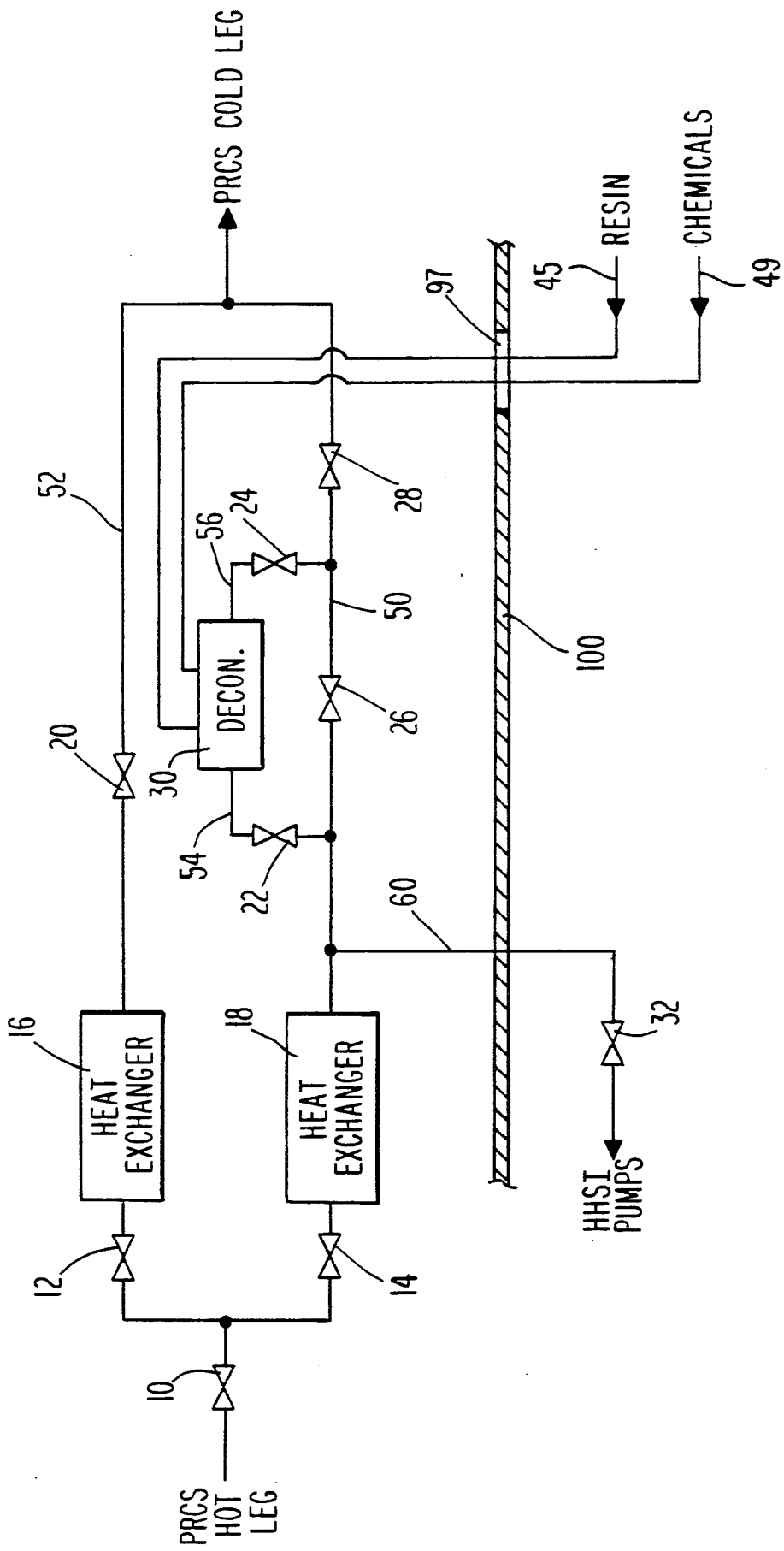
FIG. 1 is a schematic process flow diagram illustrating an embodiment of the piping connection between the decontamination system and the nuclear reactor primary residual heat removal system.

Referring to FIG. 1, a system is shown which allows for connection between a partially inside of containment decontamination system 30 and the RHR system which is also inside of containment. The containment barrier 100 ensures that any catastrophic reactor problems will not leak radiation into the outside of the containment environment.

Processed fluids from the hot leg of the primary reactor coolant system (RCS) of a nuclear reactor are fed to the RHR system via valve 10. Two RHR heat exchanger trains are shown and one such train is capable of maintaining the necessary cooling of the reactor during a fuel removal processing operation.

The primary reactor coolant is directed through valve 12 and to the primary residual heat exchanger 16 for cooling the coolant during the refueling operation. The coolant which exits the primary residual heat exchanger 16 flows through the primary line 52 and through the primary isolation valve 20 to the cold leg entry of the primary reactor coolant system.

The inventive system allows for the primary reactor coolant to be directed to the decontamination system 30. This is accomplished by directing the coolant through valve 14 and into secondary residual heat exchanger 18. The coolant exits from the secondary residual heat exchanger 18 and flows through the secondary line 50. The coolant can be directed via out-containment line 60 and to the high head safety injection (HHSI) pumps via valve 32.

The decontamination system 30 is connected to the secondary line 50 via in-containment inlet valve 22 on the in-containment inlet line 54 and in-containment outlet valve 24 on the in-containment outlet line 56. Both the in-containment inlet line 54 and the in-containment outlet line 56 are connected to the secondary line 50 at a point upstream from the secondary isolation valve 28. The secondary isolation valve 28 provides separation of the two heat exchanger trains in conjunction with the primary isolation valve 20.

The decontamination of the coolant is accomplished by directing the coolant through the secondary residual heat exchanger 18 and exiting through secondary line 50. By closing an in-containment isolation valve 26 located on the secondary line 50 downstream of the in-containment inlet line 54 and upstream of the in-containment outlet line 56, the coolant is diverted to the decontamination system 30. After the decontamination process is complete, the in-containment isolation valve 26 is opened and the in-containment inlet valve 22 and in-containment outlet valve 24 are closed.

Two lines are established between the decontamination system 30 to the outside of the containment area. Due to the limited space available for decontamination process equipment within the containment area, it is preferred to only house decontamination equipment which contacts radioactive products inside of containment. Therefore line 45 is provided which allows for fresh resin to be brought into the decontamination system 30. Also, line 49 is provided which allows for fresh chemicals to be injected into the primary fluid. These lines 45, 49 are preferably mounted to enter through the containment barrier 100 via the equipment hatch 97.

The decontamination apparatus system depicted in FIG. 1 therefore provides for the employment of a chemical decontamination system which is partially within the containment chamber. The apparatus provides for connections to the residual heat removal system at a point downstream of the secondary residual heat exchanger 18 and at a point upstream of a secondary isolation valve 28. The system allows for the positioning of all equipment used in the decontamination process which contacts the radioactive materials to be housed within the containment chamber.

Certain aspects of the equipment utilized in the full system chemical decontamination system and the process flow connections between these systems are set forth in co-pending application Ser. No. 07/621129, entitled "Clean Up Subsystem for Chemical Decontamination of Nuclear Reactor Primary Systems," and application Ser. No. 07/621130, entitled "Resin Processing System," and both of these are incorporated herein by reference However, since the entire full system decontamination process is not disclosed in either of those two applications, the full system will be set forth hereinafter Certain aspects of each system and of the connections between each system and the workings of each system are disclosed within those documents and may be helpful in understanding certain aspects of the present invention.

The preferred embodiment of the full system decontamination process as described hereinafter is sized to operate within a "four-loop" reactor. Such a reactor has four reactor coolant system steam generation systems. The same process may be employed for smaller plants utilizing "two-loop" and "three-loop" designs. The smaller plant designs would employ a smaller equipment design which would be roughly proportional to the reduction in wetted surface area compared to the "four-loop" design.

Figure 2:
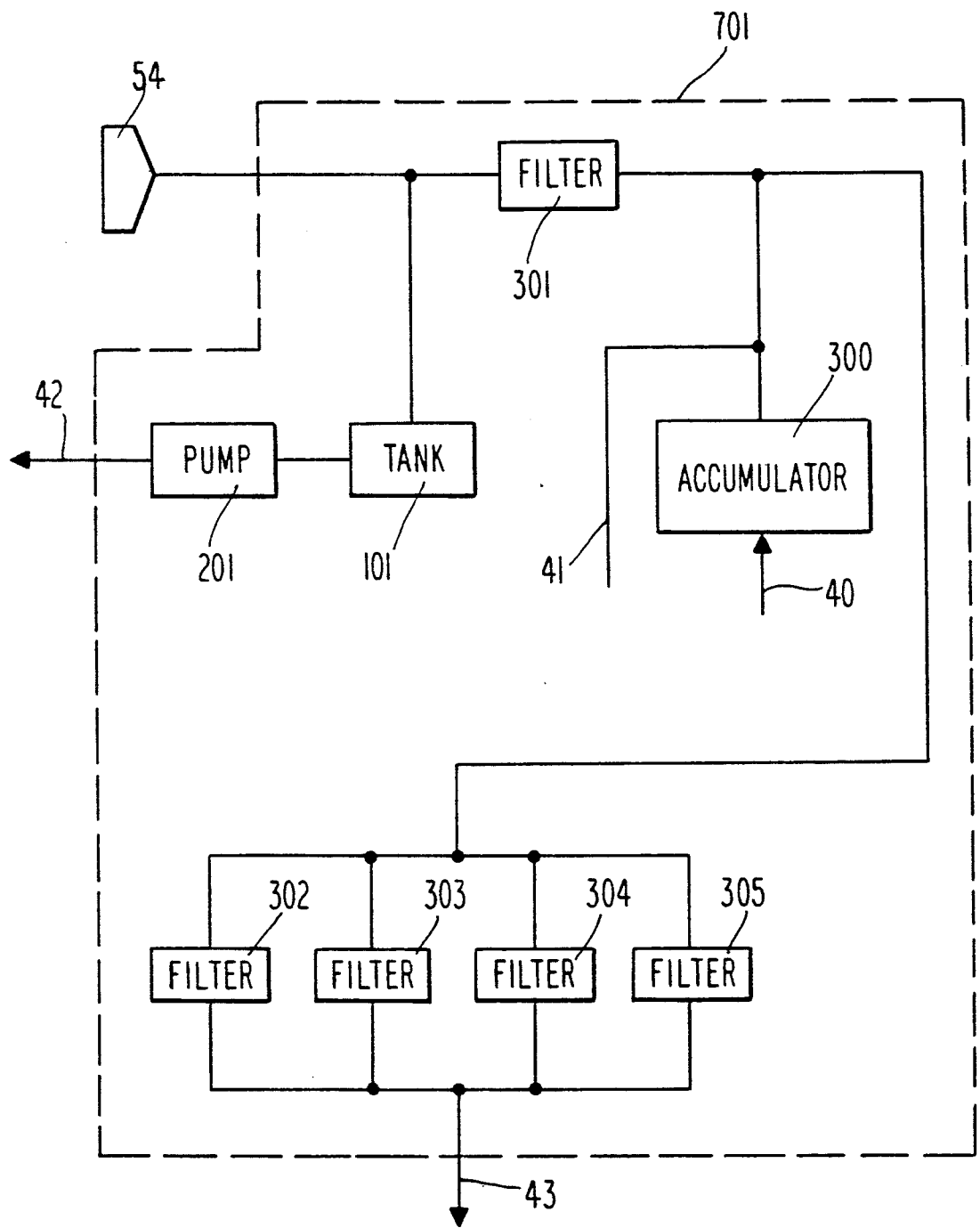
FIG. 2 is a schematic process flow diagram illustrating the optional pre-demineralizer filtering process of the chemical decontamination system.

Referring now to FIG. 2, process fluids from the primary system are sent via line 54 to an optional back-flush filter system 701. The back-flush filter system 701 is provided to filter suspended solids found in the primary system which are removed from the primary system during the decontamination. This system is provided to remove manganese dioxide colloids or other particles which may be generated during the known CAN-DEREM and LOMI techniques. Certain chemical decontamination processes may not generate suspended solids in the primary process fluids. Therefore, the utilization of the back-flash filter system 701 is considered to be optional and not a necessary element of the inventive process.

In the embodiment of the invention as shown in FIG. 2, the process fluids first enter a back-flush filter 301. This back-flush filter 301 can be periodically back-flushed by use of accumulator 300 which has an inlet nitrogen line 40 connected thereto. Also, line 41 provides demineralized water to aid in the back-flushing of the back-flush filter 301. When a back-flush step is in process the back-flushed material will be collected into filtrate collection tank 101 and can be pumped via filtrate transfer pump 201 along line 42 to any of the spent resin storage tanks 121, 122, 123, 124, 125, 126, 127, 128 shown on FIG. 5. After exiting the back-flush filter 301 the process fluids enter optional post filters 302, 303, 304 305.

The back-flush filter 301 is preferably sized to handle the entire flow rate of the decontamination process, in this case 1500 gallons per minute (gpm), and has a 5-20 micron filter. The accumulator 300 is preferably sized to have a capacity sufficient to perform a complete back-flush, in this case 30 gallons. The filtrate collection tank 101 is sized to have a capacity of several backflush volumes, and preferably about 400 gallons. The filtrate collection pump 201 is preferably sized to empty the filtrate collection tank 101 in less than an hour with a capacity of 10-50 gmp. The post filters 302, 303, 304, and 305 are designed to operate in parallel and preferably have a combined flow rate equal to the back-flush filter 301, and preferably having a capacity of about 375 gpm individually, and having about a 1 micron filter rating. Any type of filtering equipment may be used to constitute the back-flush filter system 701. Other embodiments may include the use of cartridge filters with or without a preliminary back-flush filter.

Figure 3:
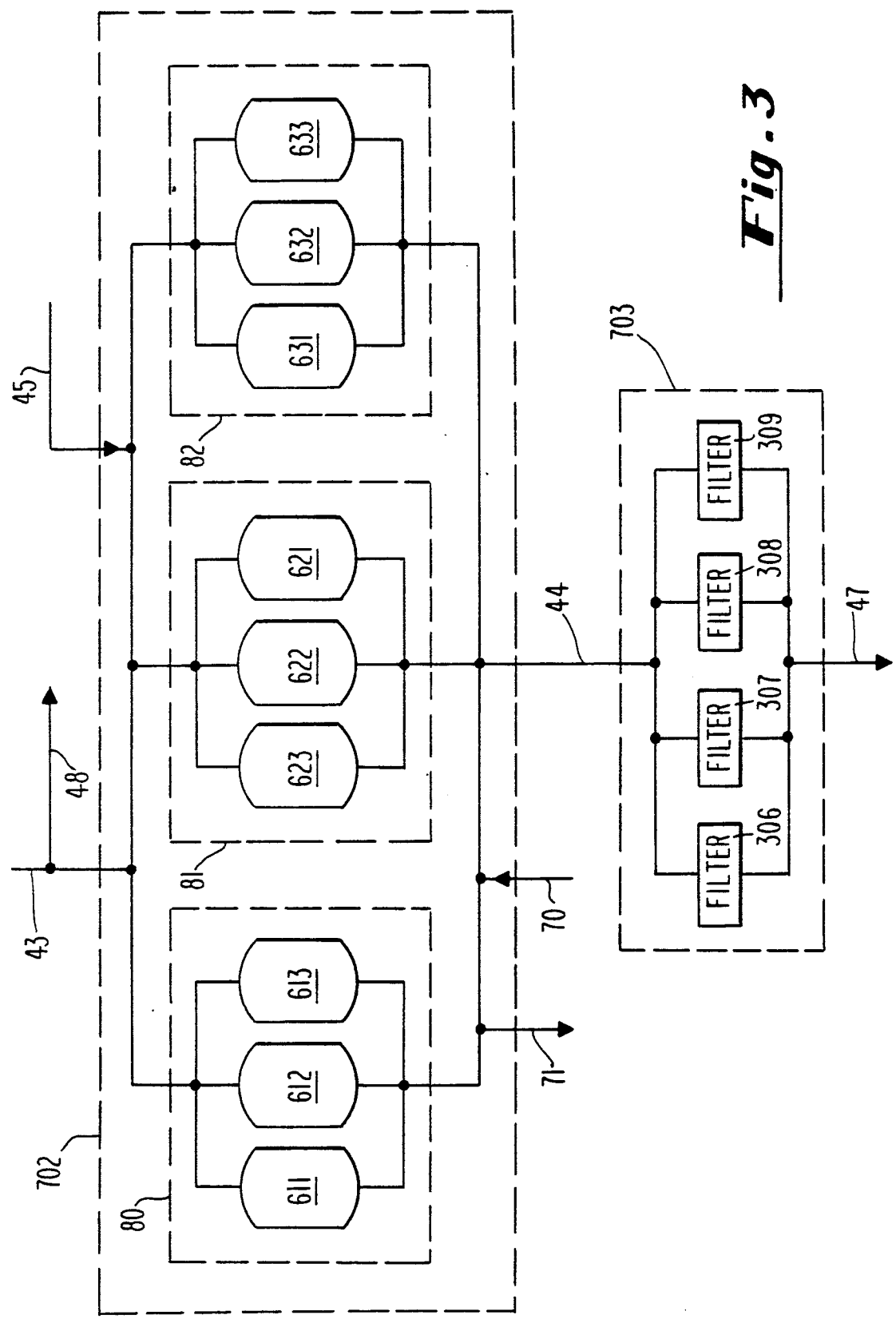
FIG. 3 is a schematic process flow diagram illustrating the demineralizer and post filtering processes of the chemical decontamination system.

After exiting the post filters 302, 303, 304, 305, the process fluid travels through line 43, and now referring to FIG. 3, enters the demineralizer system 702. The demineralizer system 702 is provided to remove up to 99% of the chemicals which are added during the chemical decontamination process. This system is shown as being comprised of demineralizers 80, 81, and 82. Preferably, at least two demineralizers are employed, however, more than two demineralizers may be used. In the preferred embodiment, demineralizer 82 is a Regen demineralizer and has a total volume of about 400 ft.$^3$ (11.3 m$^3$). Most preferably this Regen demineralizer contains three demineralizer vessels 611, 612, and 613 which each have a volume of about 133 ft.$^3$ (3.8 m$^3$). In the preferred embodiment two other demineralizers 80, 81 are also employed and each contain three demineralizer vessels 621, 622, 623, 631, 632, 633 which each have a volume of about 200 ft.$^3$ (5.7 m$^3$). The amount of ion exchange resin used for decontamination is determined by the amount of deposits which have been produced in the RCS system. A small amount of deposits in a RCS would require less resin than that required for a heavily contaminated RCS facility.

The demineralizers 80, 81, 82 are flow coupled to line 45 which is used to supply fresh resin to the demineralizer system 702. Line 70 is also provided for the introduction of sluice water to the demineralizer system 702 in a counter flow fashion to be used to flush spent resin out of the demineralizer vessels. The spent resin exits the demineralizer system 702 via line 71. The process fluid can also be diverted around the demineralizer system 702 via line 48.

After the process fluids exit the demineralizer system 702 they are transported via line 44 to the resin fines filter system 703. The resin fines filter system 703 is provided to ensure that any resin from the demineralizer system 702 does not enter the primary system. The resin fines filter system 703 preferably contains a plurality of filters which have a combined total flow rate capacity equal to the decontamination system flow rate of about 1,500 gallons per minute. In the preferred embodiment, four resin fines filters 306, 307, 308, 309 are utilized. Each resin fines filter 306, 307, 308, 309 has a capacity of about 375 gallons per minute and a filter rating of about 25 micron.

Figure 4:
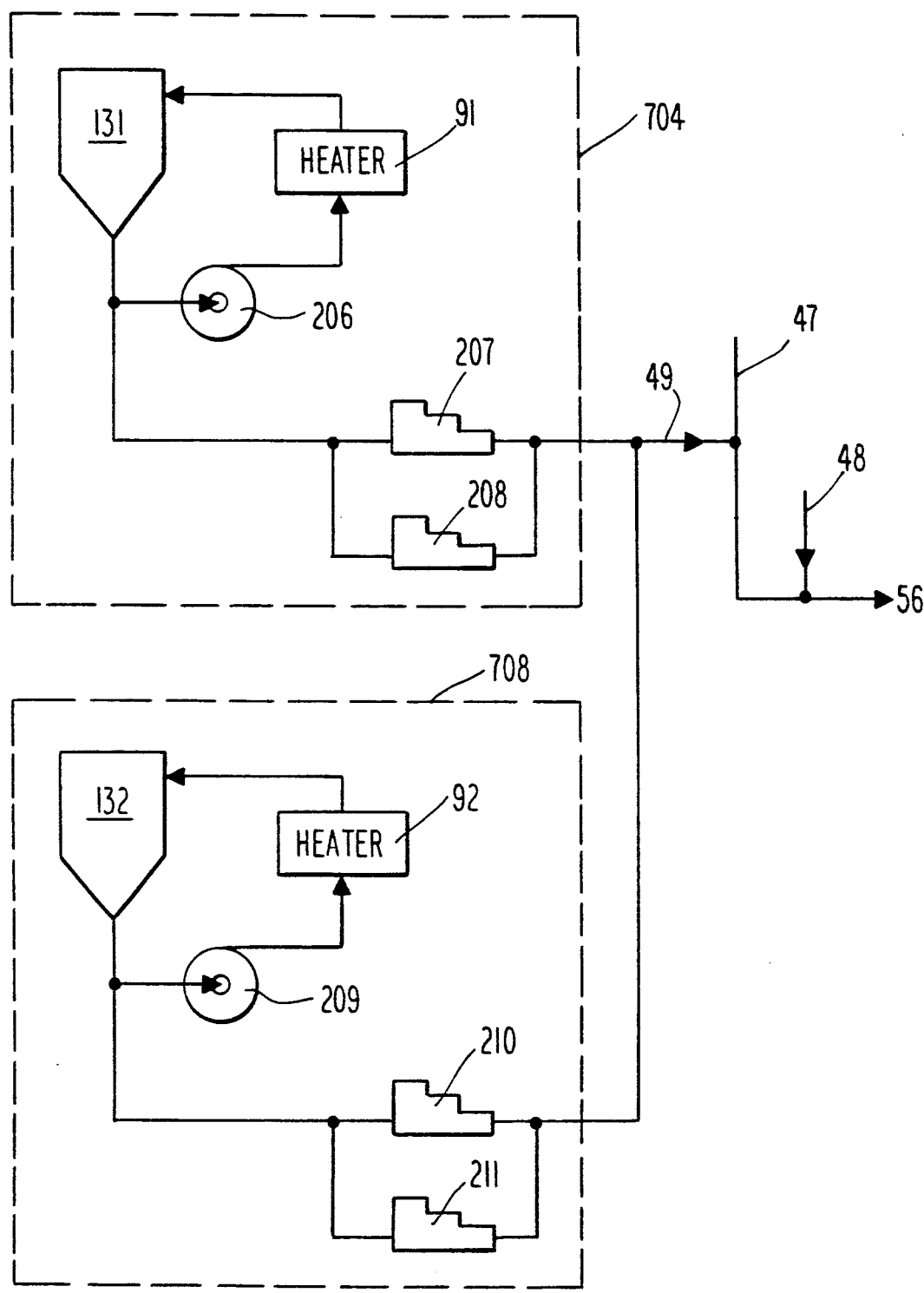
FIG. 4 is a schematic process flow diagram of the chemical injection system of the chemical decontamination system.

After exiting the resin fines filter system 703 the process fluid is transported via line 47, and referring to FIG. 4, back to the primary system via line 56.

Prior to the entry back into the primary system, chemicals are injected into the processed fluids. In the preferred embodiment, two chemical injection systems are utilized. First is a vanadous formate system 704. This vanadous formate system 704, in the preferred embodiment, has a vanadous formate tank 131 which contains the vanadous formate compounds in solution. The vanadous formate solution is preferably prepared by use of a recirculation and heater system shown in a preferred embodiment as a vanadous formate mixing pump 206 flow coupled to a vanadous formate heater 91. When the vanadous formate solution is ready to be injected into the process fluids, the vanadous formate injection pumps 207, 208 are activated. This vanadous formate system 704 is utilized when a LOMI decontamination process is required by the decontamination process.

The second chemical injection system is the chemical system 708 which is shown in the preferred embodiment as comprising a chemical mixing tank 132 which also has a recirculation and heater system shown in the preferred embodiment as chemical mixing pump 209 and chemical heater 92 for dissolving decontamination chemicals in solution. This system is capable of supplying those chemicals used in the decontamination process. When chemicals from the chemical mixing tank 132 are ready to be sent to the process, the chemical injection pumps 210 and 211 are activated. This chemical system 708 is preferably designed to handle those chemicals utilized in a CAN-DEREM process as required by the decontamination process.

In the preferred embodiment, both the vanadous formate 131 and the chemical mixing tank 132 are about 3000 gallons in size and both preferably contain an agitator. The amount of decontamination chemicals which must be injected is dependent upon the amount of deposits in the RCS. The vanadous formate mixing pump 206 and the chemical mixing pump 209 are both preferably sized for a flow rate of about 100 gallons per minute. The vanadous formate injection pumps 207, 208 and the chemical injection pumps 210, 211 are preferably sized for a flow rate of 50 gallons per minute. The chemical injection system is flow coupled to the line 47 via line 49 for injection of the chemicals into the processed deionized and filtered fluids prior to reentry of those fluids into the primary system via line 56.

Figure 5:
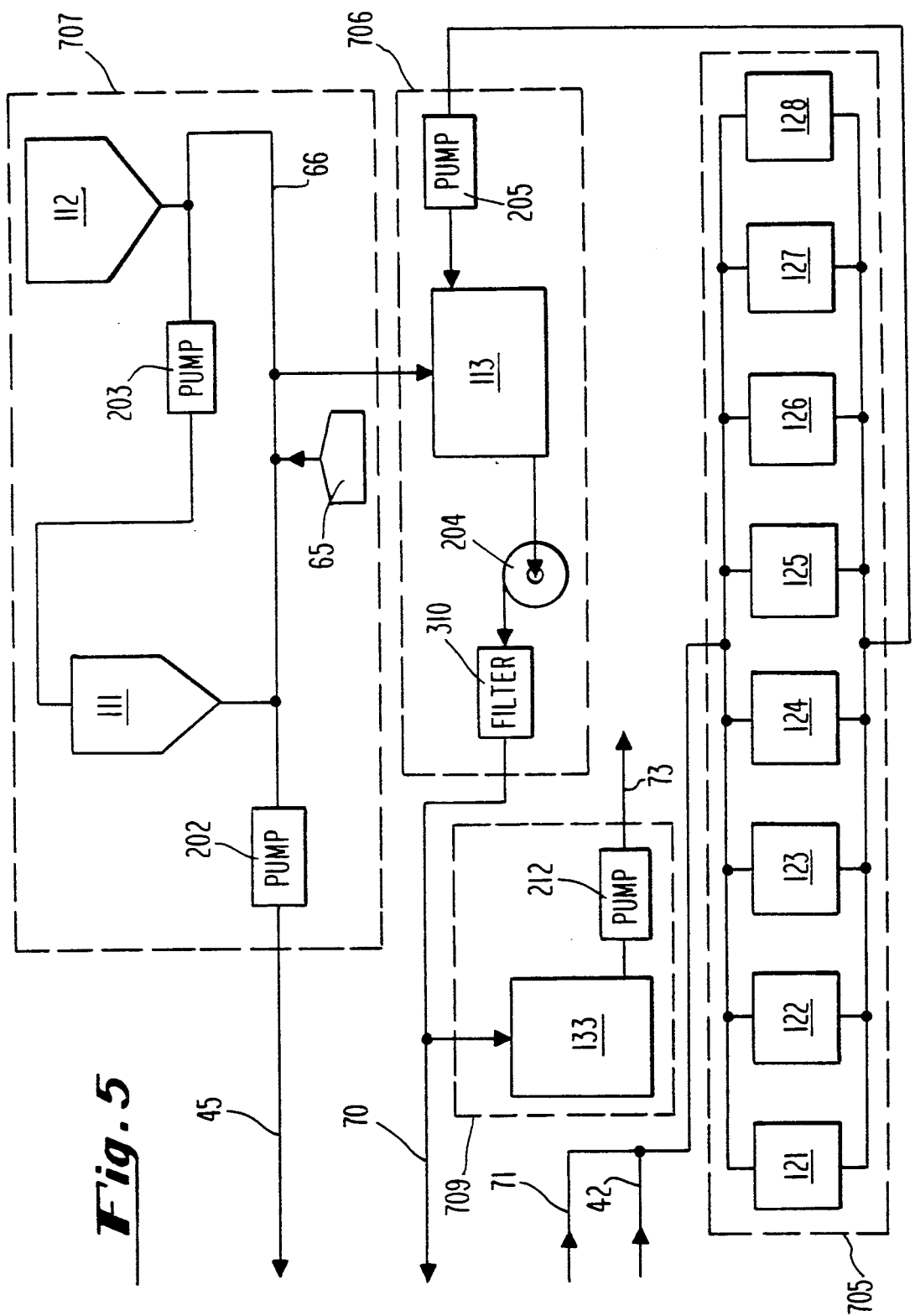
FIG. 5 is a schematic process flow diagram of the resin transport and processing system of the chemical decontamination system.

Referring now to FIG. 5, the new resin system 707, the spent resin storage system 705, the sluice water system 706, and the decontamination waste system 709 are shown. When the ion exchange resin is spent, the demineralizer system 702 has to be regenerated with new resin. The sluice water system 706 is employed to remove the spent resin. Sluice water is provided from the sluice water supply tank 113 to the demineralizer system via line 70. The sluice water travels through the sluice water pump 204 and the sluice water filter 310 prior to entering the demineralizer system 702.

The sluice water system 706 also contains a sluice water recycle pump 205 for recycling the sluice water from the demineralizer system 702. The amount of sluice water required for transport of the resin is dependent upon the amount of resin to be removed. The sluice water supply tank is preferably sized to have a capacity of 1,800 gallons of sluice water. The sluice water filter 310 is preferably sized to have a capacity of 100 gallons per minute and the sluice water pump 204 and the sluice recycle pump 205 are preferably designed to have a capacity of about 100 gallons per minute flow rates.

After the sluice water enters the demineralizers via line 70, the sluice water carries the spent resin from the demineralizer system via line 71 to the spent resin storage system 705. The spent resin storage system 705 is comprised of a series of tanks which preferably have a combined total storage volume of about 34,400 gallons. In the preferred embodiment, eight spent resin storage tanks 121, 122, 123, 124, 125, 126, 127, 128 are provided with each having a capacity of about 4,300 gallons. These tanks are provided with screen bottoms such that the sluice water exits these tanks and is recirculated via the sluice water recirculation pump 205 to the sluice water supply tank 113. Line 42, from the filtrate collection tank 101 is connected to line 71 upstream of the spent resin storage tank system 705.

A new resin system 707 is preferably included in a decontamination process overall system in order to batch fresh resin to the demineralizer system 702. The new resin system 707 is preferably comprised of a resin supply tank 112 which contains fresh resin. This tank is flow coupled to line 66 which carries demineralizer water from demineralizer water source 65. The solution of resin and demineralizer water is sent to the resin batching tank 111 by the resin supply pump 203. A quantity of resin to fill a demineralizer vessel 611, 612, 613, 621, 622, 623, 631, 632, 633 is then transported from the resin batching tank 111 by the resin feed pump 202 via line 45.

In the preferred embodiment, the resin supply tank 112 is capable of storing about 7000 gallons of resin. The resin batching tank 111 is preferably sized to hold about 2100 gallons of solution. The resin feed pump 202 and the resin supply pump 203 are both preferably sized to have a capacity of about 100 gpm.

A decontamination waste system 709 is also provided. This decontamination waste system 709 comprises a decontamination waste tank 133 which preferably has a volume capacity of about 3000 gallons. The decontamination waste tank 133 is flow coupled to line 70. A decontamination waste pump 212 is flow coupled to the decontamination waste tank 133 for pumping the decontamination waste via line 73 to a storage system. The decontamination system 709 is designed to collect waste solutions from any of the group consisting of the back-flush filter system 701, the demineralizer system 702, the spent resin storage tank 705, and the sluice water system 706.

After the full system decontamination process was developed, the task of employing such a system inside the containment chamber had to be met. Various design problems exist such as (1) ensuring that all of the equipment which contacts radioactive materials is placed inside of the containment; (2) locating the equipment so that it fits within the containment while minimizing the total length of piping between each system; (3) ensuring proper shielding of the equipment for personnel protection; (4) limiting the restrictions on the polar crane movement by the necessary piping and (5) providing for easy installment and removal of the processing equipment. Since this inventive layout of the full decontamination process is likely to be employed in currently existing reactor facilities, the amount of available area in the containment chamber is relatively small and fixed.

The design layout configuration of the present invention provides for supplying the equipment necessary for the full system decontamination process in divisible units. These units are placed upon skids which can fit through the equipment hatch of the containment chamber. Since this hatch has a diameter of about fifteen feet, skids having a maximizing height of twelve feet and a maximum width of ten feet were chosen for transporting the equipment. The use of individual skids also has the benefit of permitting the units to be pre-assembled at the factory, therefore not requiring certain assembly and testing at the installation site. These skids are also designed for easy transportation to a particular nuclear facility without the need for special transportation permits. Another key design feature was to design each system so that it could fit upon an individual skid, or a plurality of skids which would be situated in close proximity to one another. The design factor of available space in the containment area sometimes conflicts with such a skid design.

The chemical decontamination process on a full scale basis may only be needed two to three times per reactor life. It may therefore be desirable to remove the equipment when not in use. Therefore, a modular design was required which would lend itself to easy equipment set-up and removal.

Figure 6:
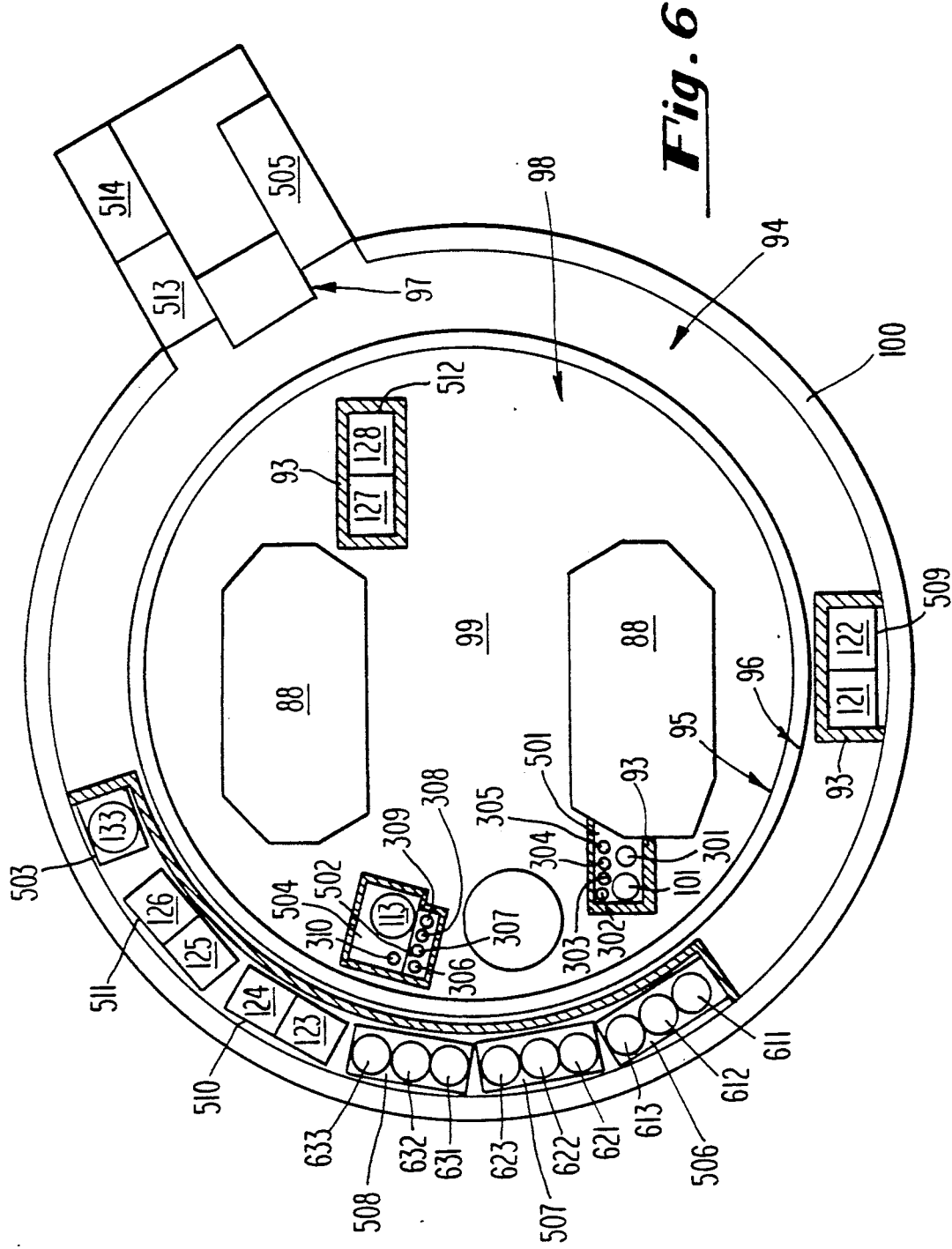
FIG. 6 is a representative schematic equipment layout of the chemical decontamination system used inside of the containment chamber.

Referring now to FIG. 6, a preferred in-containment layout design is shown in a typical four-loop pressurized water nuclear reactor. In this layout design, skid positions were established for various systems comprising the decontamination system. Due to the extreme space requirements imposed upon such an in-containment design layout, the positioning of all equipment which would not come in contact with radioactive materials is directly outside of the containment chamber. It is preferred that these outside of containment systems be as close to the equipment hatch 97 as possible to minimize piping length. The fluid and material connections between these outside of containment process units and those process units contained inside of the containment chamber 99 is made via the equipment hatch 97.

The systems which are kept outside of the containment chamber 99 are the vanadous formate system 704, the chemical system 708, and the new resin system 707. In the preferred embodiment, the vanadous formate system 704 is positioned on a vanadous formate skid 513 directly outside of the equipment hatch 97. The units comprising the vanadous formate system 704 are positioned on the vanadous formate skid 513 which preferably covers an area of about 120 ft.$^3$ (11.2 m$^2$).

Directly beside the vanadous formate skid 513 is the chemical injection skid 514. This chemical skid 514 comprises the chemical system 708. The chemical skid 514 preferably covers an area of about 120 ft.$^2$ (11.2 m$^2$).

The new resin system 707 is also located outside of containment and is located on the new resin system skid 505. The new resin system skid 505 preferably covers an area of about 230 ft.$^2$ (21.4 m$^2$).

The rest of the full containment decontamination system is housed inside of the containment barrier 100. A major difficulty in sizing the processing equipment and in locating the processing equipment was the lack of free space available and also in trying to avoid disturbing the path taken by the polar crane inside the containment chamber 99. The crane path is shown by the inside crane track 95 and the outside crane track 96 which form circles inside the containment chamber 99. The crane tracks 95, 96 therefore dissect the operating floor 98 into two distinct regions within the containment chamber 99, and create an outer operating floor annulus 94, defined by the space between the containment barrier 100 and the outside crane track 96.

An important design criteria was to minimize the amount of piping necessary to connect the different systems within the entire chemical decontamination process. In order to accomplish this, the demineralizer system 702 was divided into integral parts consisting of three demineralizer vessels per demineralizer skid. Due to the relatively large area required by the demineralizer system 702, the demineralizer system 702 was placed along the outer operating floor annulus 94. As shown in the preferred embodiment in FIG. 6, the demineralizer system 702 was located upon three skids, demineralizer system—A skid 506, demineralizer system—B skid 507 and demineralizer system—C skid 508. The demineralizer skid—A 506 contains demineralizer vessels 611, 612 and 613. This demineralizer system—A skid 506 covers an area of about 160 ft.$^2$ (14.9 m$^2$). The most preferred skid dimensions for the demineralizer system—A skid 506 are 8 ft. (2.4 m.) wide by 20 ft. (6.1 m.) long and less than 12 ft. (3.7 m.) high.

In close proximity to the demineralizer system—A skid 506 is placed the demineralizer system—B skid 507 which is preferably located as close to the demineralizer system—A skid 506 as is possible on the outer operating floor annulus 94. Directly beside the demineralizer system—B skid 507 is the demineralizer system—C skid 508. Both the demineralizer system—B skid 507 and demineralizer system—C skid 508 contain the demineralizer vessels 621, 622, 623, 631, 632, and 633. The six vessels are all equally sized and each contain a volume of approximately 200 ft.$^3$ (5.7 m$^3$) and are split three vessels per skid. By arranging the demineralizer system 702 on these three skids in a close proximity to one another, the length of piping between the three skids is minimized. This is a preferred aspect of the in-containment design layout due to the necessity for various piping systems to be connected to the demineralizer system 702.

In the preferred embodiment, single wall hose (flexible hose) is employed as the piping material. This type of piping has a lined inside and a corrugated metal tube outside. Such piping provides for flexibility in the piping system as opposed to standard piping which is stationary.

The demineralizer system—B and—C skids 507, 508 both comprise an area of approximately 160 ft.$^2$ (14.9 m$^2$), and most preferably have an 8 ft. (2.4 m.) width and a length of 20 ft. (6.1 m.) with a height of less than 12 ft. (3.7 m.). The distance between these skids is to be minimized. Preferably, the distance between each demineralizer skid—A,—B, and—C, 506, 507, 508 is less than 50 ft. (15.3 m.). Most preferably the distance between these skids is less than 20 ft. (6.1 m.), however, due to existing equipment on the outer operating floor annulus 94 the skids may not be able to be placed in a side-by-side manner.

Due to the piping which must connect the demineralizer system 702 with the spent resin storage system 705, these two systems are preferably located as close to each other as possible. However, since a vast portion of the operating floor 98 to the inside of the inside crane track 95 is occupied by equipment comprising the nuclear reactor and its steam plant, (such as the steam generators 88) the outer operating floor annulus 94 is utilized to house most of the spent resin storage tank system 705. In the preferred embodiment disclosed in FIG. 6, the spent resin storage system 705 is shown as comprising eight separate spent resin storage tanks 121, 122, 123, 124, 125, 126, 127, and 128. Each spent resin storage tank is preferably sized to contain about 4,300 gallons of solution. These tanks are preferably of a non-cylindrical shape to save space and increase fluid volume per unit area of floor space.

Spent resin storage system—A skid 509, spent resin storage system—B skid 510, spent resin storage system—C skid 511 are placed on the outer operating floor annulus 94 in the preferred embodiment shown in FIG. 6. Each of these skids contains two of the spent resin storage tanks. Due to the limited space available in the outer operating floor annulus 94 in most nuclear reactors, a few of the spent resin storage tanks may have to be located elsewhere on the operating floor 98. Since, for space saving reasons, two resin storage tanks are outfitted onto each skid system, the preferred design shown in FIG. 6 shows a spent resin storage system—D skid 512 on the operating floor 98. The spent resin storage tank skids are preferably equally sized for efficiency and interchangeability with the overall decontamination process. The preferred size of the spent resin storage system—A, B, C, D skids 509, 510, 511, 512 is 8 ft. (2.4 m.) wide and 20 ft. (6.1 m.) in length for a preferred area of about 160 ft.$^2$ (11.2 m$^2$). These skids are also less than 12 ft. (3.7 m.) in height.

The decontamination waste system 709 is also housed within the containment chamber 99. This system is preferably placed on the outer operating floor annulus 94 beside one of the spent resin storage system skids, namely spent resin storage system—C skid 511. The decontamination waste system skid 503 is preferably about 80 ft.$^2$ (7.4 m$^2$) in area and most preferably is 10 ft. (3.0 m.) in width and 8 ft. (2.4 m.) in length and a height of less than 12 ft. (3.7 m.).

Due to the scarcity of available space on the outer operating floor annulus 94, other decontamination process systems are placed on the operating floor 98. The back-flush filter system 701 is placed on a back-flush filter system skid 501 located on the operating floor 98. This skid is preferably about 120 ft.$^2$ (11.2 m$^2$) in area and most preferably 12 ft. (3.7 m.) in width and 10 ft. (3.0 m.) in length. This back-flush filter system skid 501 is located in close proximity to the demineralizer system 702 since these two systems are flow coupled together. The resin fines filter system 703 is contained on the resin fines filter systems skid 502 which is placed on the operating floor 98. This resin fines filter system skid 502 preferably covers an area of approximately 30 ft.$^2$ (2.8 m$^2$) and is most preferably 10 ft. (3.0 m.) in width and 3 ft. (0.9 m.) in length and a height of less than 12 ft. (3.7 m.).

The last system to be placed in the containment chamber 99 and on the operating floor 98 is the sluice water system 706 which is placed on a sluice system skid 504. This skid preferably covers an area of about 120 ft.$^2$ (11.2 m$^2$) and most preferably is 12 ft. (3.7 m.) in width and 10 ft. (3.0 m.) in length and a height of less than 12 ft. (3.7 m.).

All of the system skids which are housed within the containment chamber 99 require maximum shielding protection. This maximum shielding protection can be accomplished by various shielding walls. A preferred shielding wall is a 8 inch (20.3 cm.) to 24 inch (61.0 cm.) solid block wall made of concrete and most preferably concrete containing a lead additive. The shielding wall is shown in FIG. 6 as shield 93.

The preferred design for an in-containment chemical decontamination process is set forth in which all of the processing systems which handle radioactive material are located within the containment chamber of the nuclear reactor. The design employs the use of individual skid systems which allow for flexibility in equipment layout and the use of flexible single wall hose for flexibility in piping interconnections. The system is ideally constructed to allow for removal of the decontamination equipment when the equipment is not in use.

We claim:

1. A pressurized water nuclear reactor having a chemical decontamination system located primarily within a containment chamber for use in cleaning a nuclear reactor primary system containing primary process fluids, the decontamination system comprising:
   (a) a demineralizer system located in said containment chamber, said demineralizer system having a plurality of demineralizer vessels flow coupled to said primary system;
   (b) a resin fines filter system located in said containment chamber, said resin fines filter system having a plurality of resin fines filters flow coupled to said demineralizer vessels and to said primary system; and
   (c) a spent resin storage tank system located in said containment chamber, said spent resin storage tank system having a plurality of spent resin storage tanks flow coupled to said demineralizer vessels.

2. The decontamination system of claim 1 including a decontamination waste tank system located in said containment chamber, said decontamination waste tank system having a decontamination waste tank capable of receiving waste solutions from any of the group comprising the demineralizer vessels, and the spent resin storage tanks.

3. The decontamination system of claim 1 including a filter system located in said containment chamber, downstream from said primary system and upstream from said demineralizer system.

4. The decontamination system of claim 3, wherein said filter system is contained within a high activity radioactive source shield.

5. The decontamination system of claim 1, wherein said demineralizer system is contained within a high activity radioactive source shield.

6. The decontamination system of claim 1, wherein said spent resin storage tank system is contained within a high activity radioactive source shield.

7. The decontamination system of claim 1, including:
   a primary residual heat exchanger and a secondary residual heat exchanger;
   a primary residual line connecting said primary exchanger to said primary system;
   a secondary residual line connecting said secondary exchanger to said primary system;
   isolation valve means located on said secondary residual line;
   an inlet line connecting said decontamination system to said secondary residual line at a location upstream from said isolation valve means;
   inlet valve means located on said inlet line for regulating the flow of said primary process fluid into said decontamination system;
   an outlet line connecting said decontamination system to said secondary residual line at a location upstream from said isolation valve means;
   outlet valve means located on said outlet line for regulating the flow of said primary process fluid out of said decontamination system; and
   a decontamination isolation valve means located downstream from said inlet line and upstream from said outlet line and on said secondary residual line.

8. The decontamination system of claim 1 including:
   a chemical injection system located outside of said containment chamber and flow coupled to said primary system downstream of said resin fines filter system;
   an equipment hatch which when opened allows for equipment to be brought into said containment chamber; and a conduit system connecting said chemical injection system to said primary system through said equipment hatch.

9. The decontamination system of claim 8, wherein said chemical injection system includes a vanadous formate system which supplies vanadous formate into said primary process fluids.

10. The decontamination system of claim 8, wherein said demineralizer system comprises:
   a first set of demineralizer vessels having three demineralizer vessels, each about 133 ft$^3$ (3.8 m$^3$) in volume;
   a second set of demineralizer vessels having three demineralizer vessels, each about 200 ft$^3$ (5.7 m$^3$) in volume.

11. The decontamination system of claim 10, including a third set of demineralizer vessels having three demineralizer vessels each about 200 ft$^3$ (5.7 m$^3$) in volume.

12. The decontamination system of claim 6, wherein said plurality of spent resin storage tanks have a total volume of about 34,400 gallons.

13. The decontamination system of claim 12, wherein said plurality of spent resin storage tanks comprise eight spent resin storage tanks each having a volume of about 4300 gallons.

14. The decontamination system of claim 2, wherein said decontamination waste tank comprises a volume of about 3000 gallons and is contained within a high activity radioactive source shield.

15. The decontamination system of claim 8, including a sluice water system located in said containment chamber, said sluice water system flow coupled to said demineralizer system and contained within a high activity radioactive source shield, comprising:
   a sluice water filter flow coupled to said demineralizer system; and
   a sluice water supply tank flow coupled to said sluice water filter.

16. The decontamination system of claim 15, wherein said sluice water supply tank comprises a volume of about 1800 gallons and said sluice water filter is sized to handle a flow of about 100 gallons per minute.

17. The decontamination system of claim 8, wherein said plurality of resin fines filters comprises a flow rate capacity of about 1500 gallons per minute.

18. The decontamination system of claim 17, wherein there are four resin fines filters arranged in parallel, each having a flow rate capacity of about 375 gallons per minute.

19. A chemical decontamination system located primarily within a containment chamber defined by a containment wall for use in a pressurized water nuclear reactor primary system containing primary process fluids, said containment chamber containing a crane operated upon a crane track, and an equipment hatch which allows for equipment to be brought into and out of said containment chamber, said decontamination system comprising:
   (a) a demineralizer system located in said containment chamber and connected to the primary system, said demineralizer system having nine demineralizer vessels arranged in three sets of three of said demineralizer vessels, each of said sets located on a separate demineralizer skid;
   (b) a resin fines filter system located on a resin fines filter system skid in said containment chamber, said resin fines filter system having four resin fines filters having a total capacity of about 1500 gallons per minute, said resin fines filter system flow coupled to said demineralizers; and
   (c) a spent resin storage tank system located in said containment chamber, having eight spent resin storage tanks having a total capacity of about 34,400 gallons, arranged on four spent resin skids each containing two of said spent resin storage tanks.

20. The decontamination system of claim 19 including a decontamination waste system skid in said containment chamber, having a decontamination waste tank flow coupled to said demineralizer system.

21. The decontamination system of claim 19 including a filter system located on a filter system skid in said containment chamber, connected downstream from the primary system and connected upstream to said demineralizer system.

22. The decontamination system of claim 19 including a chemical injection system located outside of said containment chamber and flow coupled to said primary system downstream of said resin fines filter system and a conduit system connecting said chemical injection system to said primary system through said equipment hatch.

23. The decontamination system of claim 19 including a sluice water system located on a sluice water system skid in said containment chamber and flow coupled to said demineralizer system, comprising:
   a sluice water filter flow coupled to said demineralizer system; and
   a sluice water supply tank flow coupled to said sluice water filter.

24. The decontamination system of claim 19, wherein each of said demineralizer skids cover an area of about 160 ft$^2$ (14.9 m$^2$) and are located between said crane track and said containment barrier.

25. The decontamination system of claim 19, wherein said resin fines filter system skid covers an area of about 30 ft$^2$ (2.8 m$^2$).

26. The decontamination system of claim 19, wherein each of said spent resin skids cover an area of about 160 ft$^2$ (14.9 m$^2$) and some of which are located between said crane track and said containment barrier.

27. The decontamination system of claim 20, wherein said decontamination waste system skid covers an area of about 80 ft$^2$ (7.4 m$^2$) and is located between said crane track and said containment barrier.

28. The decontamination system of claim 21, wherein said filter system skid covers an area of about 120 ft$^2$ (11.2 m$^2$).

29. The decontamination system of claim 22, wherein said chemical injection system comprises:
   a vanadous formate skid having a vanadous formate tank flow coupled to said primary system; and
   a chemical skid having a chemical tank flow coupled to said primary system.

30. The decontamination system of claim 23, including a new resin system skid containing a new resin batch tank flow coupled to said demineralizer system and a new resin supply tank flow coupled to said new resin batch tank.

* * * * *